E. MOSSÉ.
ADVERTISING APPARATUS.
APPLICATION FILED JAN. 29, 1914.

1,128,488.

Patented Feb. 16, 1915.

2 SHEETS—SHEET 1.

Witnesses

Inventor
Edgar Mossé
by his Attorneys

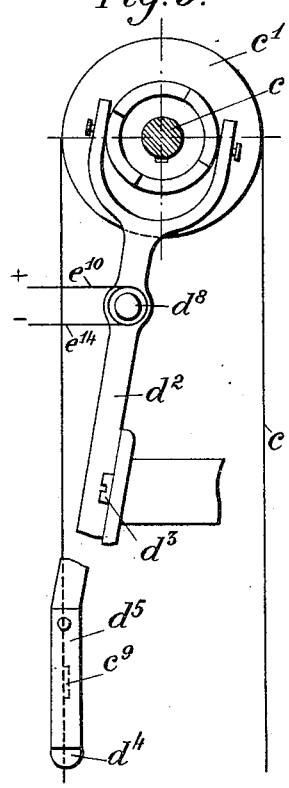
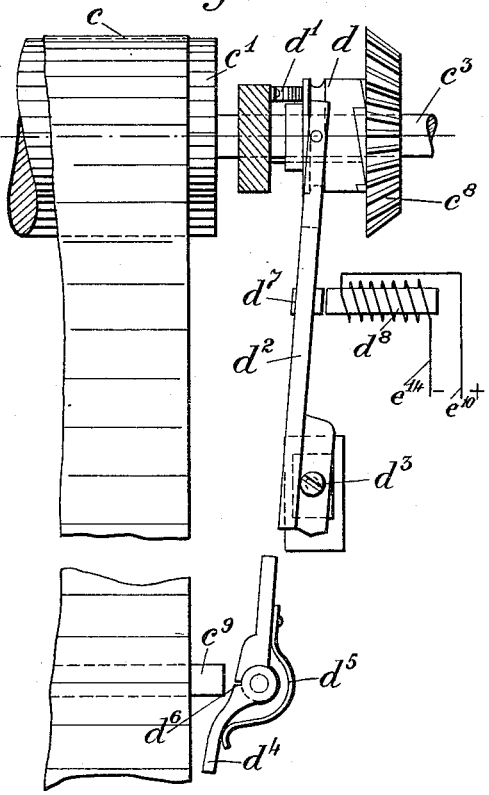
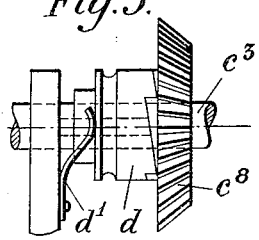

UNITED STATES PATENT OFFICE.

EDGAR MOSSÉ, OF LILLE, FRANCE.

ADVERTISING APPARATUS.

1,128,488.      Specification of Letters Patent.      Patented Feb. 16, 1915.

Application filed January 29, 1914.  Serial No. 815,260.

*To all whom it may concern:*

Be it known that I, EDGAR MOSSÉ, civil engineer, a citizen of the French Republic, residing at Lille, in the Department of the Nord, France, have invented a new and useful Advertising Apparatus, of which the following is a specification.

The present invention relates to advertising apparatus, and consists in the constructions, combinations and arrangements herein described and claimed.

In all the apparatus hitherto proposed, the emission of the sound by the phonograph and the appearance of the advertisement took place simultaneously, and one did not think of arranging the production of the two effects in proper relation. It is, however, advantageous in this kind of publicity to make the appearance of the advertisement last for some time after the phonograph has spoken. In other words, if the phonograph pronounces an advertisement corresponding for example with the subject of an illustration, it is advantageous in order that the publicity may produce the greatest possible effect, to arrest the movement of the illustration while allowing the phonograph to continue to speak. The illustration corresponding to the advertisement spoken by the phonograph is thus kept before the eyes of the public. When the phonograph has ceased speaking the apparatus stops and is started again automatically by means of a clock work mechanism as in the known similar apparatus so as to repeat the operation described above.

The object aimed at by the present invention is to obtain the result indicated above by an apparatus, the characteristic of which resides in the use of a coupling, which at a given moment, that is to say, when one of the advertisements has been brought into place by the forward movement of the strip of cloth which carries the advertisement, enters automatically into action and stops the strip while the phonograph continues and finishes its announcement.

The accompanying drawings show by way of example a form of execution of the apparatus according to the present invention.

Figure 1:
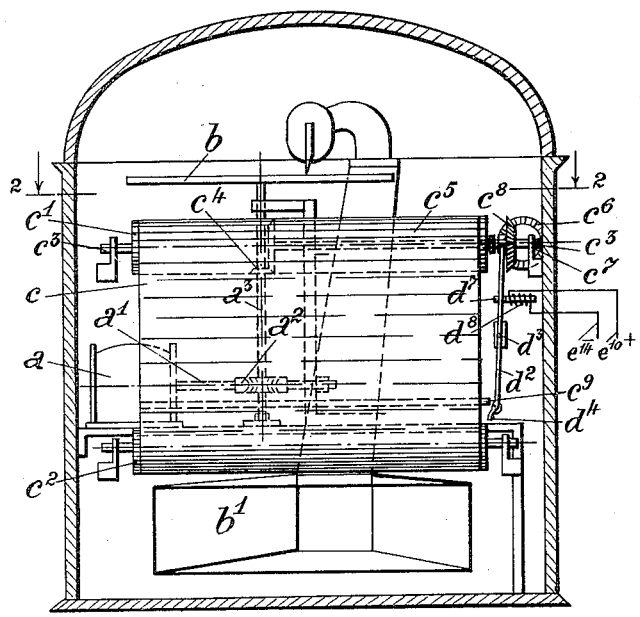
Figure 2:
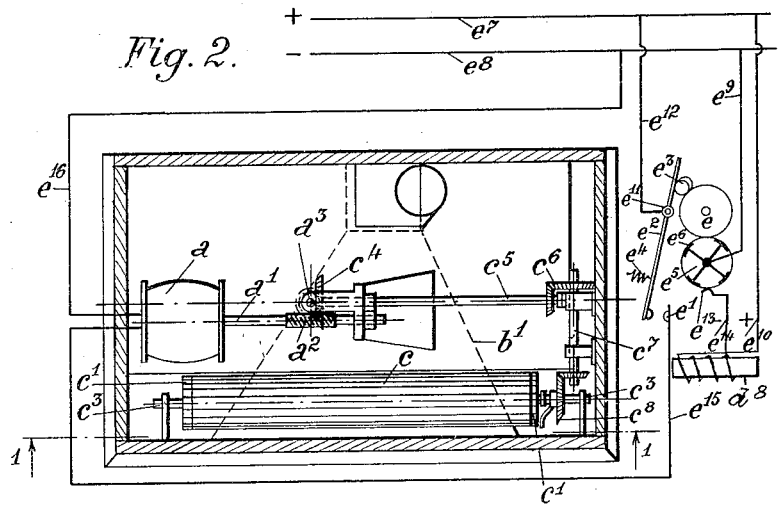

Figure 1 is an elevation of the apparatus, in section along the line 1—1 of Fig. 2. Fig. 2 represents a section of the apparatus along the line 2—2 of Fig. 1, as well as a diagrammatic view of the connections; Figs. 3, 4 and 5 show in detail the coupling mechanism to a larger scale.

$a$ is the dynamo which by the intermediary of a shaft $a^1$, a worm-wheel and worm $a^2$ and of a shaft $a^3$ drives the disk $b$ of the phonograph which is connected to the horn $b^1$.

$c$ is the strip of cloth carrying one or more advertisements; it is mounted on two rollers $c^1$ and $c^2$; roller $c^1$ being mounted on the shaft $c^3$. The latter is driven from the dynamo by means of a shaft $a^3$ through the intermediary of bevel wheels $c^4$, a shaft $c^5$, another set of bevel wheels $c^6$, a shaft $c^7$ and a third set of bevel wheels $c^8$, one of which is loose on the shaft $c^3$.

On the shaft $c^3$ is mounted a clutch coupling $d$ rotating with the shaft but capable of sliding thereon so as to engage or disengage the wheel $c^8$. The spring $d^1$ tends to maintain the coupling in engagement. This coupling is connected to a lever $d^2$ pivoted at $d^3$ and terminating in a movable finger $d^4$ having a spring $d^5$, the oscillating movement of which finger is limited in one direction by stops $d^6$. This lever is provided with an armature $d^7$ which is adapted to be attracted by the core of an electro-magnet $d^8$.

A tappet $c^9$ which can act upon the finger $d^4$, is fixed to the strip $c$. A plurality of tappets are employed according to the number of the advertisements, each of the latter having its own tappet.

The apparatus is provided with the customary clock-work mechanism $e$ which at the desired intervals establishes a contact at $e^1$ by the intermediary of a lever $e^2$ and a cam $e^3$; the lever $e^2$ is under the action of a spring $e^4$. A wheel of insulating material $e^5$ is provided with a predetermined number of contact studs $e^6$ which are connected by the intermediary of the shaft of the wheel $e^5$, by a wire $e^9$ to the main conductor $e^8$. The brush $e^{13}$, connected by a wire $e^{14}$ to the electro-magnet $d^8$, rubs against the wheel $e^5$, and the electro-magnet $d^8$ is connected to the main conductor $e^7$ by a wire $e^{10}$. From the contact $e^1$ there is led a wire $e^{15}$ which is connected to one of the poles of the dynamo $a$, the other pole being connected by a wire $e^{16}$ to the main conductor $e^8$. The pivot $e^{11}$ of the lever $e^2$ is connected by a wire $e^{12}$ to the main conductor $e^7$.

The apparatus operates as follows:—
When contact is made at $e^1$, the dynamo $a$ is set into motion and drives simultaneously the disk $b$ of the phonograph and the strip $c$. The phonograph then begins to pronounce a certain advertisement while at the same time the corresponding illustration appears on the strip $c$. As soon as the illustration is in place, the tappet $c^9$ encounters the finger $d^4$ and causes the lever $d^2$ to oscillate, the spring $d^5$ overcoming the resistance of the spring $d^1$. The coupling $d$ becomes uncoupled from the wheel $c^8$, the shaft $c^3$ stops and the movement of the strip $c$ ceases automatically. The phonograph however, continues to speak until the clock work mechanism $e$ breaks contact at $e^1$ and the dynamo $a$ is consequently stopped. The entire apparatus is therefore at rest and the coupling $d$ is disengaged. As soon as contact is made again at $e^1$ the apparatus comes again into action and at the same time the coupling is automatically engaged with the wheel $c^3$ by means of the electro-magnet $d^8$, which is excited by its circuit being closed by the contact of the brush $e^{13}$ with one of the studs $e^6$. The strip $c$, being then drawn along, compels its tappet $c^9$ to pass the finger $d^4$ by depressing it against the action of spring $d^5$; as soon as the tappet has passed the finger, the latter under the action of its spring resumes its normal position, as shown in Fig. 4, in which it is held by the stops $d^6$.

I claim:

1. An advertising apparatus comprising a phonograph, means for driving said phonograph, a roller, a strip of material bearing advertisements adapted to be wound up on said roller, a coupling adapted to couple said roller to the phonograph-driving means, a pivoted lever by which said coupling is carried, a number of tappets, corresponding in number to the number of advertisements, mounted on said strip, a spring finger on said lever in the path of said tappets to swing the lever to disengage the coupling and adapted to yield to allow the tappets to pass.

2. An advertising apparatus comprising a phonograph, means for driving said phonograph, a roller, a strip of material bearing advertisements and adapted to be wound up on said roller, a coupling adapted to couple said roller to the phonograph-driving means, a pivoted lever by which said coupling is carried, a number of tappets corresponding in number to the number of advertisements, mounted on said strip, a spring finger on said lever in the path of said tappets to swing the lever to disengage the coupling and adapted to yield to allow the tappets to pass and an electro-magnet adapted to attract said lever to reëngage said coupling when the phonograph is restarted.

3. In an apparatus of the class described, the combination of a roller, a web actuated by said roller, a plurality of tappets projecting from said web, a drive shaft, a mechanical clutch arranged to couple said roller to said drive shaft, a spring normally tending to move said clutch to couple said roller and shaft, and a pivoted lever carrying said clutch and arranged in the path of said tappets to be struck and moved thereby to disengage said clutch.

4. In an apparatus of the class described, the combination of a roller, a web actuated by said roller, a plurality of tappets projecting from said web, a drive shaft, a clutch arranged to couple said roller to the drive shaft, a pivoted lever carrying said clutch and arranged in the path of said tappets to be struck and moved thereby to disengage said clutch, and a yielding finger on said lever adapted to permit passage of said tappets without actuating the lever.

5. In an apparatus of the class described, the combination of a roller, a web actuated by said roller, a plurality of tappets projecting from said web, a drive shaft, a mechanical clutch arranged to couple said roller to the drive shaft, a pivoted lever carrying said clutch and arranged in the path of said tappets to be struck and moved thereby to disengage said clutch, means for holding said lever to prevent actuation by said tappets, and a yielding finger on said lever adapted to permit passage of said tappets when the lever is held by said means.

EDGAR MOSSÉ

Witnesses:
HANSON C. COXE,
JOHN BAKER.